Dec. 18, 1962 D. M. FENSKE ET AL 3,068,575

THREE-DIMENSIONAL DATA PLOTTING APPARATUS

Filed May 28, 1956 5 Sheets-Sheet 1

INVENTORS
DONALD M. FENSKE
JACK R. FEDRICK
BY ROBERT N. MILLER

C. I. Stratton

ATTORNEY

THREE-DIMENSIONAL DATA PLOTTING APPARATUS

Filed May 28, 1956 5 Sheets-Sheet 2

INVENTORS
DONALD M. FENSKE
JACK R. FEDRICK
BY ROBERT N. MILLER
C. G. Stratton
ATTORNEY

THREE-DIMENSIONAL DATA PLOTTING APPARATUS

Filed May 28, 1956 5 Sheets-Sheet 3

INVENTORS
DONALD M. FENSKE
JACK R. FEDRICK
ROBERT N. MILLER
BY C. F. Stratton
ATTORNEY

THREE-DIMENSIONAL DATA PLOTTING APPARATUS

Filed May 28, 1956 5 Sheets-Sheet 4

INVENTORS
DONALD M. FENSKE
JACK R. FEDRICK
BY ROBERT N. MILLER
C. G. Stratton
ATTORNEY Dec. 18, 1962 D. M. FENSKE ET AL 3,068,575

THREE-DIMENSIONAL DATA PLOTTING APPARATUS

Filed May 28, 1956 5 Sheets-Sheet 5

INVENTORS
DONALD M. FENSKE
JACK R. FEDRICK
BY ROBERT N. MILLER
C. G. Stratton
ATTORNEY United States Patent Office 3,068,575

Patented Dec. 18, 1962

3,068,575
THREE-DIMENSIONAL DATA PLOTTING APPARATUS

Donald M. Fenske, Hermosa Beach, Jack R. Fedrick, Downey, and Robert N. Miller, Hermosa Beach, Calif., assignors, by mesne assignments, to Ling-Temco-Vought, Inc., Dallas, Tex., a corporation of Delaware Filed May 28, 1956, Ser. No. 587,735
7 Claims. (Cl. 33—20)

This invention relates to the art of graphically representing data of various kinds, the invention dealing with an apparatus for recording and indicating data in graphical form. The present invention deals more particularly with a method of extending present two-dimensional plotting techniques into a three-dimensional display, thus allowing graphical presentation of data for three simultaneous variables.

Much of modern business, scientific, educational, military, etc. activity depends largely upon the use of graphical records and representations as a visual means of presenting something that exists elsewhere or has existed in the past. The many forms that these records and representations may take are quite familiar and are, for example, photographs, artistic renderings, line drawings, charts, maps, graphs, and the like. Although it is possible to produce any graphical record by manual methods, for speed and accuracy it is usually preferable to use special machinery, such as cameras, recorders, or plotters. The different records usually produced by these methods are alike in that they consist of patterns of varying degrees of opacity or reflectance on a flat sheet of material. As such, it is possible to show patterns of light intensity characteristic of a visual scene or to create synthetic patterns representing variable functions which by themselves cannot be visualized. An example of such synthetic patterns may be given as the path of an aircraft across a map or a graph to indicate the price variations of the stock market over a period of years. As is apparent, the field of utility of such records and representations is extremely broad, yet the number of variables is severely curtailed by the fact that the entire record is limited to the confines of a flat surface. Thus, there can be only two independent variables to locate any point, and opacity or reflectance and color are the only dependent variables.

It is evident that the limitations of graphic two-dimensional representations are quite confining with relation to sensory powers capable of visualizing a third dimension. Advantage is frequently taken of the stereo-effect as a way of partly overcoming two-dimensional limitations, the same constituting the phenomenon of vision that allows the fusion of the individual two-dimensional images from each eye to create a single image having the illusion of depth. Depth discrimination due to binocular vision is well developed in those having normal sight in both eyes.

Also, advantage has been taken in the graphic arts to produce three-dimensional representations by means of stereo-photographs. Basically, this is a method of taking separate two-dimensional photographs from displaced vantage points corresponding to the images that would be seen if the eyes were placed at these points. By selectively viewing these photographs so that each eye sees only the photograph taken from the vantage point corresponding to that eye, it is possible to visually create a reconstruction of the original scene. This technique, in general, is not restricted to photography. Other types of stereo-records have been made by tediously plotting from computed stereo-displacements to produce three-dimensional paintings, line drawings, maps, graphs, etc. These are generally satisfactory in the uses for which they are intended but, from a practical standpoint, such an extraordinary amount of labor is required that the same is quite uneconomical and only a very limited utilization has been made of the stereo-phenomenon outside of the photographic process.

The present invention contemplates a practical method for synthetically producing stereo-presentations in which actual photographing of physical objects is not involved. Such a method would have numerous applications. Apparatus to carry out the method is contemplated to be capable of producing a "stereo-pair" which when viewed, would appear as a three-dimensional plot derived from dimensional material supplied. Such apparatus, it is contemplated, would, in effect, be a three-dimensional plotter capable of showing relationships among three independent variables and is deemed to have immediate utility in the fields of science and engineering where, at present, such relationships can only be concluded by interpretation of two-dimensional graphs of plots which represent two or more views of what is in reality a three-dimensional relationship. Another use for such apparatus would be to aid in the preparation of three-dimensional line drawings or renderings by providing the required computed stereo-displacement on separate drawings. Ordinary techniques may be used to produce such drawings or renderings but, when the same are viewed in a stereo-manner, the desired depth relationship would be established. The above, of course, includes the preparation of three-dimensional maps and charts. Further, the ability of such a plotter apparatus to show height relationship would make it useful in the plotting of aircraft and missile trajectories. Many additional fields of use of such a method and apparatus will become evident as the following detailed description unfolds.

Considering the present limitations of two-dimensional displays and recognizing the urgent need for and the wide application of a three-dimensional display, it is an object of this invention to provide a recording method for plotting a function of three variables.

Another object of this invention is to provide a plotting apparatus for producing two separate plots which comprise a stereo-pair showing the three-dimensional relationship among three separate and independent variables.

It is a further object of this invention to provide apparatus for plotting a three-dimensional trace in the presence of a three-dimensional scale or grid and thus allowing dimensional information to be taken in the direction of any of the three coordinate axes.

A further object of the invention is to provide a method of inserting two- or three-dimensional graphic representations additional and/or auxiliary to the functions of the traces being plotted, these serving to coordinate the plots, set an environment therefor, or generally improve the information being given.

A still further object is to provide a method that provides a plurality of traces plotted in two or three dimensions or in combinations thereof without mutual interference between traces.

A still further object of the invention is to provide apparatus of the type referred to in which a plurality of plotting traces may be simultaneously or in combination produced in two or three dimensions and which may be coded with color and/or trace discontinuity for improved or enhanced differentiation.

The invention also has for its objects to provide such means that are positive in operation, convenient in use, easily installed in working position and easily disconnected therefrom, economical of manufacture, relatively simple, comparatively compact in construction, and of generally superiority and serviceability.

The invention also comprises novel details of construction and novel combinations and arrangements of parts, which will more fully appear in the course of the following description. However, the drawings and the following description merely describe preferred embodiments of the present invention, which are given by way of illustration or example only.

In the drawings, like reference characters designate similar parts in the several views.

Figure 1:
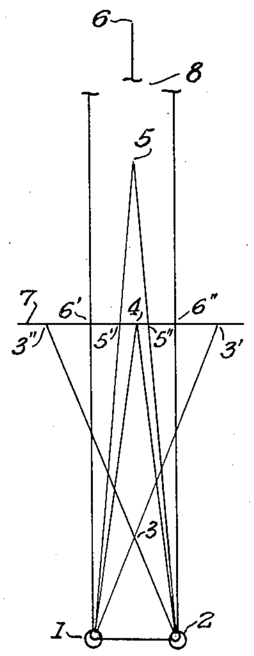
FIG. 1 is a diagrammatic view illustrating the geometric relationships pertaining to depth perception.

A first requirement to a discussion of this invention is a proper understanding of the known principles of stereoscopic vision and its relationship to the creation of the illusion of depth. These basic principles can be best understood by consideration of the diagram in FIG. 1. Here it is assumed that an observer has his left eye located at point 1 and his right eye at point 2 and is viewing small objects 3, 4, 5 and 6 at increasingly greater distances. A break is indicated in the diagram at point 8 to indicate that object 6 may be located at a considerable distance from the observer. For the comparative reference to apparent image positions, an arbitrary plane 7 is located at a convenient distance from the observer. Point 4 is assumed to be located in this reference plane. The distance between 1 and 2 corresponds to the interocular distance of the observer's eyes. It is to be understood that the perception of depth is a subjective phenomenon that results from the fusion of the independent images provided to the brain by each of the eyes. If these images are identical, a condition which occurs when observing objects at great distances, it is impossible to perceive depth variations. However, as objects at closer distances are viewed, there is a difference of perspective between the two images due to the slightly different vantage points at which the observer's eyes are located.

Referring again to FIG. 1, it is to be noted that the lines of sight between the eyes and the respective objects become increasingly convergent as successively closer objects are viewed. This convergence increases the ability to perceive slight variations and depth by causing double images of all objects not at the same distance as the object being viewed. This is apparent by noting that when the observer's eyes 1 and 2 are viewing object 6 at a great distance, the lines of sight are substantially parallel and are separated by the interocular distance. Thus, at reference plane 7 there are two separate and distinct locations 6' and 6'' of object 6 for the left eye 1 and right eye 2, respectively. For a closer object 5, these apparent image locations 5' and 5'' have smaller separation as the lines of sight become increasingly convergent until, for an object 4 located in reference plane 7, there is an apparent coincidence of the left and right eye images. An object 3, located in front of the reference plane, results in apparent image locations 3' and 3'' at the reference plane 7 and the same are again displaced by reason of the convergence of lines of sight. In this case, however, it will be noted that the right eye 2 sees an apparent image location 3'' that is now to the left of the left eye image location 3'.

The displacements, as a function of distance of eye images at a reference plane, constitute the basic principle upon which stereoscopic reconstruction of an apparently three-dimensional image is based. Although, for practical reasons, the graphic arts are limited to images in a two-dimensional plane, it is possible through the use of displaced images in a single plane 7 to create an illusion of objects suspended in space even though, in reality, their images are contained in plane 7. Thus, if a reproduction of the right eye image 3'' and the left eye image 3' of object 3 are located at the reference plane, as shown, and a method is provided so that the right eye 2 sees only the right eye image 3'' and the left eye 1 sees only the left eye image 3', then the observer will see an apparent suspended image of the object 3 in its proper location.

There are three known ways of accomplishing the desired separation of images. This separation is essential for the proper viewing of stereoscopic reproductions and is necessary in order to prevent confusion. If either eye is allowed to see both the right and left eye images 3' and 3'', it is improbable that the observer will be able to see a three-dimensional image unless he has had special training and practice in converging his line of sight to see the single fused image 3 instead of two separate and probably overlapping or coincidental images at plane 7.

Three known methods are (1) mechanical separation and optical viewing of stereoscopic images, (2) the use of complementary colored stereoscopic images and viewing filters, and (3) the use of cross-polarized stereoscopic images and viewing filters.

Figure 2:
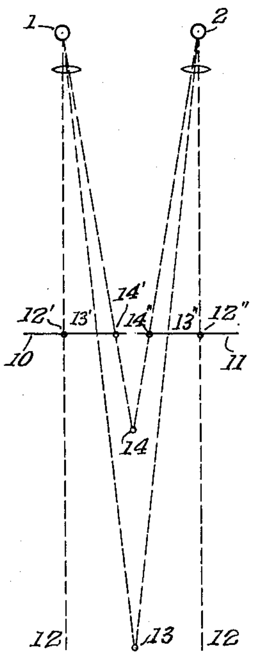
FIG. 2 is a diagrammatic view of a maner of creating a three-dimensional effect using a separate image for each eye.

The mechanical separation method (1) of viewing three-dimensional photographs is embodied in the oldtime and familiar stereoscopic viewers and, in the modern three-dimensional slide viewers. This method is shown diagrammatically in FIG. 2. Two surfaces 10 and 11 carrying the objects to be viewed are located on a common plane and are displaced by a distance approximately equal to the interocular distance. In normal viewing, the distance between the viewing surfaces 10 and 11 and the observer's eyes 1 and 2 is so small that lenses 9 must be provided to allow the observer to focus his eyes on the before-mentioned image surfaces. The manner in which the illusion of depth is created can best be understood by considering a left eye image 12' located on surface 10 and a right eye image 12″ located on surface 11. The left eye 1 sees only the left eye image 12′ and the right eye 2 sees only the right eye image 12″, giving the illusion of an object 12 to be located at a greater distance from the observer. Since the separation between 12′ and 12″ is made approximately equal to the interocular distance, the object 12 is perceived to be at a considerable distance. Similarly, images 13′ and 13″, having a smaller separation, appear as an object 13 at an apparently lesser distance. It will be noted further that further decreased separation, such as that of images 14′ and 14″, gives an object 14 at a relatively short distance.

Figure 3:
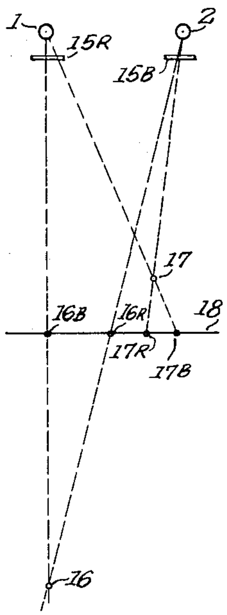
FIG. 3 is a diagrammatic view showing a manner of creating a three-dimensional effect using colored images to form an anaglyph.

FIG. 3 shows the method (2) of viewing stereo-records in which the separation of right and left eye images is accomplished through the use of complementary colors. This method has the important advantage of permitting both right and left eye images to appear on the same surface 18. Selective viewing of the two images is accomplished through the use of colored inks and colored filters in which the color of the ink and the color of the filters are such that the spectral distribution of light reflected from the ink passes with minimum attenuation through the corresponding filter but is greatly attenuated by the complementary color filter. The colors usually found most satisfactory are intense red and blue in which the red image 16R on a white background 18 appears invisible through the red filter 15R but appears with high contrast through the blue filter 15B. Similarly, the blue ink 16B is invisible through the blue filter 15B but appears to be black through the red filter 15R. In FIG. 3, the blue image 16B and the image 16R are then seen by the left and right eyes respectively as an object 16 behind the reference surface 18. Similarly, 17R and 17B give apparent image location 17, the same appearing to be in front of reference plane 18 by virtue of the reversed displacement between the two images. It is essential for proper viewing of this type of stereo-reproduction that the colors be carefully chosen to prevent ghosts of the displaced images appearing to the opposite eye; otherwise, some confusion may result. This method, of course, also has two important weaknesses: one is that the use of multi-colored images is impossible and, two, that the viewing of surface 18 through such different colors as red and blue causes eyestrain.

Figure 4:
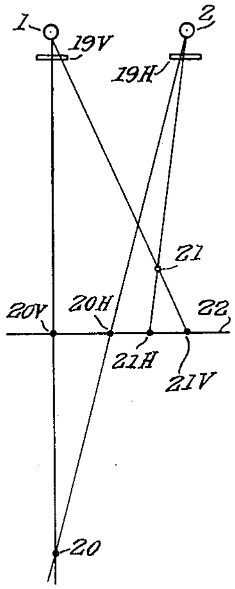
FIG. 4 is a diagrammatic view showing a modification of FIG. 3, in which cross-polarized light is used to form the images comprising the anaglyph.

A more satisfactory method of viewing right and left images on the same surface 22 embodies method (3) and is shown in FIG. 4. The use of polarized light in the formation and viewing of stereo-images eliminates the previously mentioned objections characteristic of the complementary color method of viewing. Since the polarized light does not affect colors, it is possible to view three-dimensional images in full color and without eyestrain. The separation of images is accomplished through the phenomenon of crossed-polarization. If a vertically polarized image is passed through a vertically polarized filter, the image brightness is attenuated only slightly by the polarizing filter. However, the vertically polarized image is greatly attenuated by a horizontaly polarized filter and therefore remains invisible. The manner in which this is employed is evident from FIG. 4, where the observer's left eye 1 views the darkened image plane 22 through a vertically polarized filter 19V and his right eye is similarly viewing through a horizontally polarized filter 19H. A pair of illuminated images, one vertically polarized 20V and the other horizontally polarized 20H, may be thus viewed as a single image 20 located behind the reference plane 22. And similarly, a second pair of 21H and 21V polarized images with reversed displacement appears as an image 21 in front of the reference plane 22.

Figure 5:
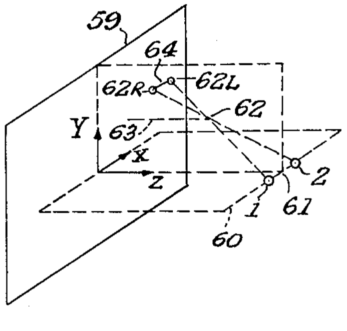
FIG. 5 is a perspective view showing the geometric axes to be used for recording data in three dimensions.

In all the descriptions to follow of methods of forming stereo-records and apparatus to accomplish this result, it is assumed, as shown in FIG. 5, that there are three principal axes in Cartesian coordinates, exemplified by arrows X, Y and Z. The observer's eyes 1 and 2 are considered to be viewing the X—Y plane 59 from a location in the Y—Z plane 60 such that the interocular separation 61 will be entirely in the X direction. This choice of axes allows separate plots 62R—62L, to be made in the X—Y plane 59, of an object 62 in space. The Z displacement 63 is shown by a relative displacement 64 in the X direction between said plot images 62R and 62L. This choice of axes is preferred since it permits the simplest plotting mechanisms to be used and allows the stereo-displacement 64 as a function of the Z displacement 63 to be computed in a simple manner. When input dimensional information is provided as a function of a different set of axes, it will be possible to translate this dimensional information into the X, Y and Z axes required by the plotting instrument. To do this, a computer, employing standard analog methods, may be constructed as a physical realization of the standard geometric equations for the translation and rotation of axes. Therefore, it will be assumed that all dimensional information to be plotted will initially be provided as input dimensional information or input coordinate reference in the desired X, Y and Z axes.

The viewing of any object in relationship to a more distant object or background always presents problems because of such phenomena as parallax and perspective. Parallax causes an apparent displacement of the location of the object being viewed with respect to any surface unles that object is viewed exactly normal to that surface. This is an important consideration in the design of a three-dimensional plotting instrument, since it will often be desirable to known the relationship between a line apparently suspended in space and its background chart or map. Perspective is also an important consideration since an observer viewing a three-dimensional object sees all parts from a single location. The shapes and relationships of all objects are modified, then, by their distance and angular relationship to the observer.

An advantage of the use of stereo-viewing of three-dimensional objects is that parallax and perspective are fixed at the time that the stereo-pair is made and cannot be modified by subsequent changes in the observer's position. This is an important consideration in the design of a three-dimensional plotting instrument since the parallax and perspective may be established or altered to meet any particular requirement.

In a majority of applications it is desirable to plot a trace which is to be viewed in relationship to a background scale or map. In such a case it is desirable to eliminate, insofar as is possible, the effects of both parallax and the perspective distortion generally associated with single-point viewing. Rather, it is advantageous to show the plotted trace in true relationship to the background scale or map regardless of the position of the observer. In effect, what is needed is to present a plot in which every point is shown in true vertical perspective. This is an artificial situation which could not occur if it were not possible to synthesize the conditions under which the stereo-pair is to be made.

Where it is required that the positional relationship of a plotted image with respect to background scales, charts or maps be evident to the observer, it is preferable to take advantage of the control of parallax and perspective afforded by stereographic viewing. It is possible to provide full control of these factors in the plotting process, producing a record in which vertical perspective is maintained over the entire area of the plot. The manner in which this is accomplished is evident from FIG. 6. In this perspective, the stereo-displacements of right eye image 65R and left eye image 65L are made equal and opposite. This gives the appearance of a floating point 65 situated in space exactly vertically over the proper location 64 in the reference plane 66. Equal displacement of images is maintained over the entire plotted area, giving the effect that the observer's eyes 1 and 2 are exactly above the apparent image location 65 regardless of its position in the X—Y plane. No modification of the X and Y positions as a function of Z variations is then required, since the subjective image position 64 will have the same X and Y coordinates as the floating image 65. The right image 65R and left image 65L are displaced from the subjective image position 64 by equal and opposite amounts denoted by $D_R$ and $D_L$. The magnitude of this displacement D is a function of the interocular distance S and the distance L between the observer's viewing plane 67 and the reference plane 66, as well as the height H of the image 65 above reference plane 66. By similar triangles it is evident that:

$$\frac{D}{S}=\frac{H}{L-H} \quad (1)$$

$$D=\frac{HS}{L-H} \quad (2)$$

$$D_R=-D_L=\frac{D}{2}=\frac{1}{2}\left(\frac{HS}{L-H}\right) \quad (3)$$

Thus, it is possible to position the image in the Z direction by an amount H by displacing the locations of the images in opposite directions by the computed factor D. It is noted from these relations, that for negative values for H, the relative sign of D is negative, indicating a reversal of the relative directions of displacement.

This presentation has an important advantage in that the relative positions of all points in three-dimensional space are apparent at a glance. However, a difficulty that will be important in many instances is that the relative locations of the images in relation to each other or to the reference plane are subjective. To a person with normal eyesight, the apparent location of image 65 in plane 66 should lie at 64 midway between the actual image locations 65R and 65L. In actual practice, a person with one eye that is weaker than the other may tend to weight this location toward the image seen with the stronger eye, and of course it is evident that a person with the sight of only one eye will see only the image location intended for that eye.

To rectify errors of this type, the stereo-displacement can be introduced in a slightly different manner (shown in FIG. 7) that will permit the exact relative positions of images to be observed at will. This is accomplished by always allowing one eye 1 to see a true plot 65L of any point 65 in vertical perspective. The other eye 2 then sees the displaced image 65R needed to give three-dimensional depth. Again by similar triangles:

$$\frac{D}{S}=\frac{H}{L-H} \quad (4)$$

$$D=\frac{HS}{L-H} \quad (5)$$

Figures 7, 9:
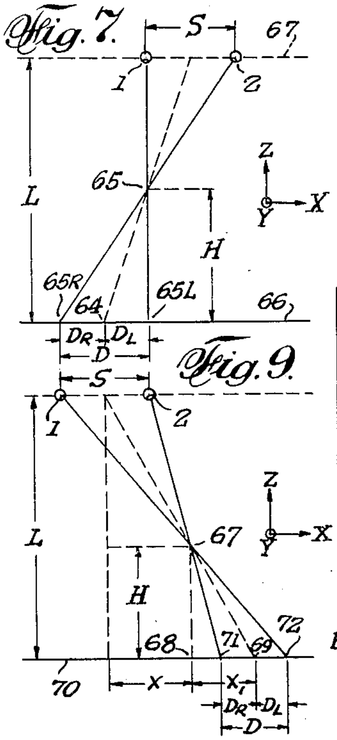
FIG. 7 is a diagrammatic view similar to FIG. 6, but showing an alternative manner of displacing the plotted image.
FIG. 9 is a similar view at right angles to FIG. 8 showing the effect of perspective upon the displacement of right and left eye images.

A disadvantage of this method of plotting is that the subjective position 64 in FIG. 7 is no longer on a true vertical and, as a result, the apparent positions of image 65 with respect to the reference plane 66 will now be slightly displaced as a function of Z variations. However, the true vertical relationships between all objects can be determined instantly at any time by the expedient of eliminating the displaced image. This may be done by merely closing eye 2 or, if convenient, such as in the case of a projected image, by eliminating the corresponding image 65R.

The previous methods of plotting, as in FIGS. 6 and 7, do not give true perspectives, since every point is viewed as if it were exactly below the observer. A true perspective will view an object vertically at only one point, all other points being modified according to their angle of obliquity relative to a point of sight. In the Y—Z plane (FIG. 8), a true perspective requires that the location of an image 67 be displaced from its normally plotted position 68 to a new position $Y_2$ (69) by an amount $Y_1$ which is a function of the Y displacement from the origin $Y_0$, the distance L of the observer 1, 2 from the X—Y reference plane 70, and the height H of image 67. This relation can be determined by similar triangles:

$$\frac{Y}{L-H}=\frac{Y_1}{H} \quad (6)$$

$$Y_1=Y\left(\frac{H}{L-H}\right) \quad (7)$$

$$Y^2=Y+Y^1=Y\left(1+\frac{H}{L-H}\right) \quad (8)$$

$$=Y\left(\frac{L}{L-H}\right) \quad (9)$$

Similarly, in the X—Z plane (FIG. 9), the subjective image location 69 of image 67 is displaced from its normally plotted position 68 by an amount $X_1$. Again using similar triangles:

$$\frac{X}{L-H}=\frac{X_1}{H} \quad (10)$$

$$X_1=X\left(\frac{H}{L-H}\right) \quad (11)$$

$$X_2=X+X_1=X\left(1+\frac{H}{L-H}\right) \quad (12)$$

$$=X\left(\frac{L}{L-H}\right) \quad (13)$$

Because of the interocular separations between left eye 1 and right eye 2, it is necessary to displace the right and left images by an amount D, where D is determined from similar triangles:

$$\frac{D}{H}=\frac{S}{L-H} \quad (14)$$

$$D=S\left(\frac{H}{L-H}\right) \quad (15)$$

Note that the stereo-displacement of images is identical to that determined for previously-discussed true vertical perspectives (Equation 2). The displacement D can be split to displace the images 71 and 72, as shown in FIG. 9.

It is the purpose of this invention to utilize the stereographic principles in apparatus for producing a three-dimensional plot or drawing from dimensional information supplied in a three-dimensional coordinate system. To do this, it is the present intention to provide a two-coordinate plotting instrument having two marking components in which the stereo-displacement may be automatically varied as a function of the third coordinate. It is contemplated to incorporate into the instrument means to allow viewing in three dimensions of the recorded plot, and provide such auxiliary graphical information as may be required to complete the usefulness of the resulting recordings. The manner in which this may be accomplished can be best understood by referring to FIG. 10. This view represents the simplest embodiment of the present invention. The same comprises a single channel recording instrument capable of drawing a line image indicative of the relationship among three independent variables. Despite its relative simplicity, this apparatus is capable of producing acceptable three-dimension plots in a form that may be easily viewed, stored, and, if desired, may easily be reproduced.

A component of this apparatus of this invention is a rigid, preferably rectangular plotting board or table 25 which provides support for a sheet of plotting paper or material 26. Along opposite edges 27 and 28, mounting provisions and suitable bearings (not shown) are provided for rotatable shafts 29 and 30 which are mounted in parallelism with each other and with the front 27 and rear 28 edges of the plotting board. The ends of shafts 29 and 30 are fitted with pulleys 31 of uniform diameter. Steel cables 32 of small size but high tensile strength connect the pulleys in pairs on the ends of shafts 29 and 30 at each end of the plotting board. These cables may be provided with one or more complete wraps or turns around each pulley to provide positive or non-slipping traction with said pulleys so that angular rotation imparted to either of the before-mentioned shafts will be transmitted with equal measure to the other. Said cables 32 are attached to the end pieces 33 and 34 of a transverse carriage rack 42 consisting of the end piece 33, two parallel transverse rods 35, and the end piece 34 on the opposite end of the board from piece 33. This carriage rack is arranged to slide freely across the face of the plotting board 25 between the edges 27 and 28. The positive attachment of end pieces 33 and 34 by means of cables 32, to end pulleys 31 and shafts 29 and 30 insures that, as the carriage rack is moved in the direction marked Y, exact parallelism will be maintained between rods 35 and the front surfaces 27 and 28.

The end pieces 33 and 34 are respectively provided with pulleys 36 and 37 that are carried on axes transverse to that of shafts 29 and 30. A cable 38 similar to the before-mentioned cable 32 is provided with one or more wraps or turns around and connects the pulleys 36 and 37. This cable 38 encircles the plotting board 25, is securely fastened to a movable carriage 39 located above said board, and has its return run on the underside of the board. The parallel rods 35 provide a rigid support upon which carriage 39 is free to move in the direction marked X and, therefore, transverse to the direction Y.

Carriage 39 carries a fixed marking instrument or stylus 40 and a movable marking instrument or stylus 41. Each of these marking instruments is arranged to make a separate and permanent record of its translated movements on the plotting sheet 26. Translation is provided in the direction of the Y coordinate by motion of the entire carriage rack 42 and movements in the X direction are, in turn, provided by motion of the carriage 39 relative to the rack 42. The first translation movement is controlled by means 43, such as a reversible Y axis servo-motor arranged to rotate shaft 29. A reference of the position of the plotting mechanism along the Y axis is provided by means of a potentiometer 44 connected to shaft 30. This position reference may be compared with a voltage reference applied to the input of a conventional null-seeking servo-mechanism amplifier to control the servo-motor to position the plotting mechanism at the command of the said input reference. Similarly, a reversible X axis control servo-motor 45, attached to pulley 36, provides a means for translating the recording mechanism in the X direction, while a reference potentiometer 46 provides a measure of the X coordinate position. The electrical wiring to these motors and potentiometers is not shown for reasons of clarity.

The marking styli 40 and 41 are arranged to record the images to be seen by the right and left eye, respectively. To do this, the recorded traces 47, 48 must be adapted for selective viewing. One method of accomplishing this result is to use a recording stylus 40 that is connected to an ink reservoir 49 filled with red ink. Similarly, recording stylus 41 and its reservoir 50 are filled with blue ink. Thus, trace 47 will be red and the trace 48 will be blue. These colors are complementary and other complementary colors may be used. These recorded traces are displaced from each other by a computed distance that is a function of desired translation in the Z axis, and the result is viewed such that the right eye 2 will see only the red trace 47, and the left eye 1 will see only the blue trace 48. As described in connection with FIG. 3, this requires that the right eye 2 be provided with a blue filter 15B and the left eye 1 be provided with a red filter 15R. When thus viewed, the apparent result to the observer will be a single trace, shown schematically as 51, that can be translated in the direction of any of the three axes.

If the resulting three-dimensional presentation is to have practical value, it is essential that the translation between styli 40 and 41 have a definite and computable relationship to variations in the Z axis. The movement of the recording stylus 41 with respect to the fixed stylus 40 is accomplished by means of a sliding member 52 carrying stylus 41 and its reservoir 50. Translation is accomplished by means preferably shown here as a reversible Z axis servo-motor 53 driving a threaded shaft 54 engaging a threaded nut 55 which forms a part of member 52. Monitoring of these translations is accomplished through the use of stereo-displacement reference potentiometer 56 connected to shaft 54. It is apparent, however, that, although the separation of the recording styli is a function of variations in the Z axis coordinate, this function is non-linear and it is, therefore, necessary to modify or compute the required separation and control the before-mentioned Z axis controlled motor 53 in accordance with the computed value of separation. It should be noted that because of possible interference of pens 40 and 41, it is not possible to plot negative values of the displacement H between the styli unless the apparent reference plane is above the plotting surface 26. This can be done by establishing zero reference with enough displacement to prevent interference. This has a slight disadvantage in requiring the reference to be at or above the apparent plotting surface, but does not detract from the utility of the plotter.

For convenience in plotting and viewing, it is also possible and desirable to establish, in advance of the plot, a reference grid to establish the three-dimensional location of the plotting plane 26 or, in many cases, to provide the plotting material 26 in advance with a red and blue scale which when viewed will appear as a three-dimensional graphical chart. This technique can also be used to provide a three-dimensional background or topographic map. Thus, the sheet 26 may constitute any suitably embellished base area.

Figures 10, 11:
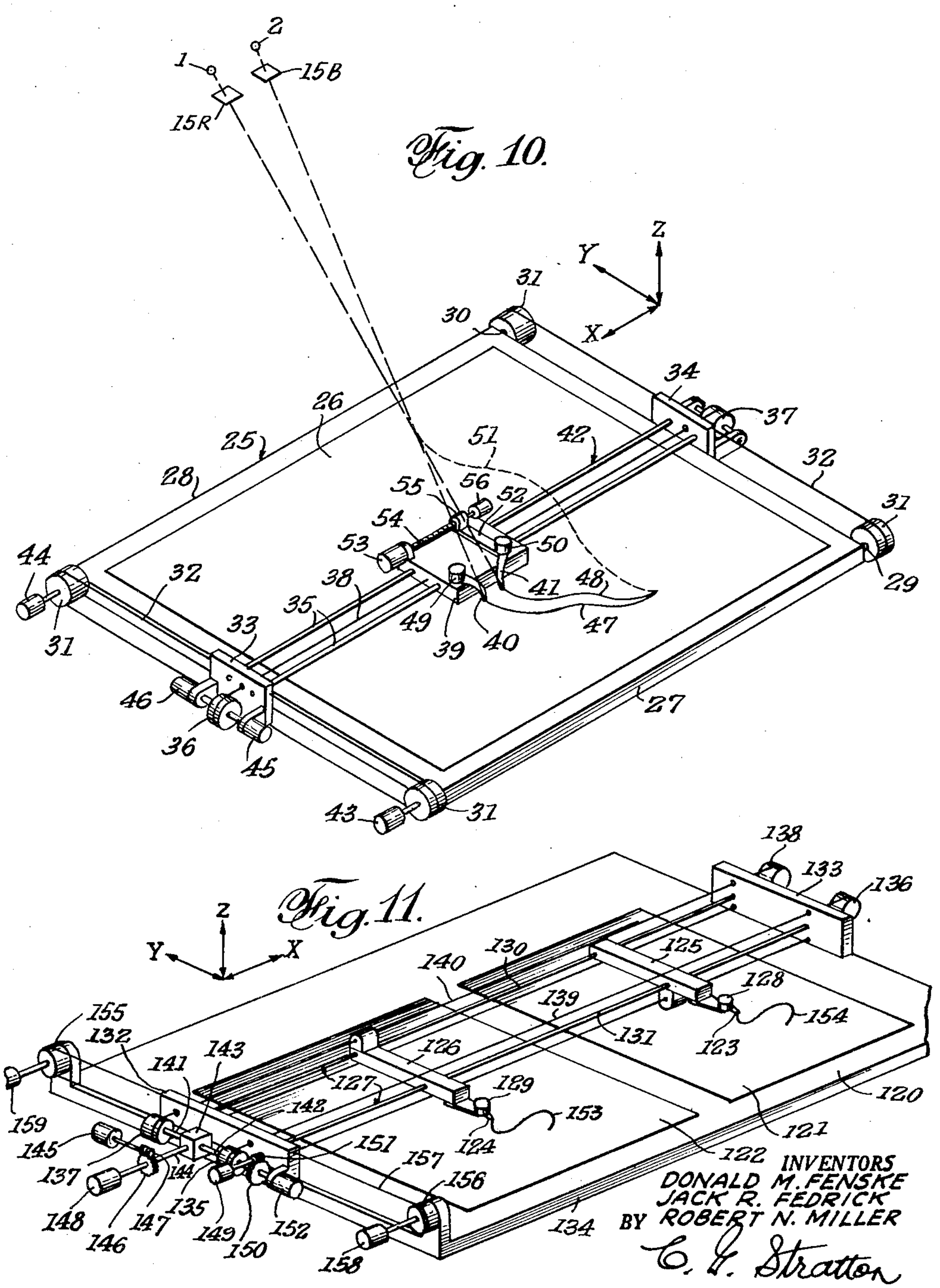
FIG. 10 is a perspective view of apparatus according to the present invention for plotting in rectangular coordinates and in three dimensions.
FIG. 11 is a perspective view of alternative apparatus for simultaneously plotting in rectangular coordinates, the two plots produced constituting a stereo-image.

FIG. 11 shows a three-dimensional stereographic plotter intended for the direct viewing of a three-dimensional plot of a function of three independent variables, X, Y and Z. It differs from the plotter described in FIG. 10 in that it is adapted to make two separate plots, each on its own base area or piece of recording material. These plots are intended to be viewed directly as a stereo-pair. The elimination of the necessity to view the plot through colored filters allows this instrument to be viewed with greater facility and less eye fatigue than the simpler instrument previously described. The manner in which three-dimensional plots are obtained will become more evident from the following description.

The apparatus illustrated in FIG. 11 comprises a plotting board 120, a sheet of plotting material 121 intended for viewing by the right eye and a similar sheet of plotting material 122 intended for viewing by the left eye. Independent plotting instruments 123 and 124, mounted on separate carriages 125 and 126 are freely movable in the direction of arrow X. These carriages, in turn, are mounted on a rack 127 which may be moved in direction Y. Provision is also made to vary the relative displacement of carriages 125 and 126 to allow individual stereoscopic plots to be made of the recorded functions.

The recording instruments 123, 124 are shown as pens having ink reservoirs 128, 129. These are rigidly mounted on respective carriages 125 and 126 which are provided with guides and sliding bearings to fit guide shafts 130 and 131. These carriages are arranged to slide freely and smoothly, maintaining mutual alignment. The rack 127 comprises the mentioned guide shafts 130, 131 and end brackets 132, 133 which carry the ends of said shafts and are arranged to move freely along the opposite ends of the plotting board 120. The rack, thus, bridges the plotting board and the surface of sheets 121, 122 thereon. At all times, accurate parallelism of rods 130, 131 is maintained with the front edge 134 of the plotting board. Adjacent the forward edges of end pieces 132, 133 the same are respectively provided with shaft-mounted pulleys 135, 136. Similarly, adjacent the opposite edges, said pieces 132, 133 are provided with the respective pulleys 137 and 138. A steel cable 139 is wrapped with one or more turns around pulleys 135 and 136 and is arranged to form a loop in parallelism with shaft 131 connecting said pulleys, so that pulley 135 is the driving pulley and pulley 136 is the idler pulley. The lower or return section of cable 139 is attached to an integral ear of carriage 125, providing a positive means of translation in the X direction of said carriage. Similarly, a cable 140 forms a loop around and between driving pulley 137 and idler pulley 138, and is attached on its upper or driven portion to carriage 126, providing a means of translation in the X direction of said latter carriage.

Pulley 137 is mounted on a shaft 141 and pulley 135 is attached through shaft 142 to a conventional gear differential unit 143. The spider gear shaft 144 of the differential unit 143 is geared to a reversible servo-drive motor 145 through a worm gear 146 and a worm 147. A stereo-displacement reference potentiometer 148 is attached to gear 146 and provides a reference of the position of the spider gear shaft 144 of differential unit 143. Shaft 142 extends through pulley 135 and is driven by a reversible servo-control motor 149 through a worm gear 150 and a worm 151. A potentiometer 152 is attached to gear 150 and provides a reference of the position of pulley 135 and thus of the position of carriage 125 along the X coordinate. Translation of carriage 125 is accomplished through the operation of servo-motor 149. The resultant movement of pulley 135 is transmitted through shaft 142 and, by virtue of the fixed position of the spider shaft 144, is transmitted through differential unit 143, appearing as a reverse and equal rotation of shaft 141 and of pulley 137. Although the movement of cable 140 is equal and opposite to the movement of cable 139, the movement of carriage 126 will be the equal and in the same direction as carriage 125 by virtue of their attachment to opposite sides of the cable loops 139 and 140.

Operation of motor 145 will cause rotation of the spider shaft 144 of differential 143. Since the position of pulley 135 is locked by gears 150 and 151, there will be no displacement of carriage 125 by servo-motor 145. This action of the differential unit causes angular displacement of pulley 137 resulting in a movement of carriage 126 with respect to carirage 125. This provides a means of introducing stereo-displacement between traces 153 and 154 as a function of variations in the Z axis.

Displacement of the entire rack 127 in the Y axis is provided by a pulley 155, a pulley 156, and a connecting cable 157. Cable 157 is provided with one or more wraps about each said pulley and is attached to end piece 132 of the rack to provide a means of positive translation of the rack. A reversible servo-control motor 158 is attached to pulley 156 providing drive control, and a potentiometer 159 attached to pulley 155 to give a reference of Y axis position.

Figure 12:
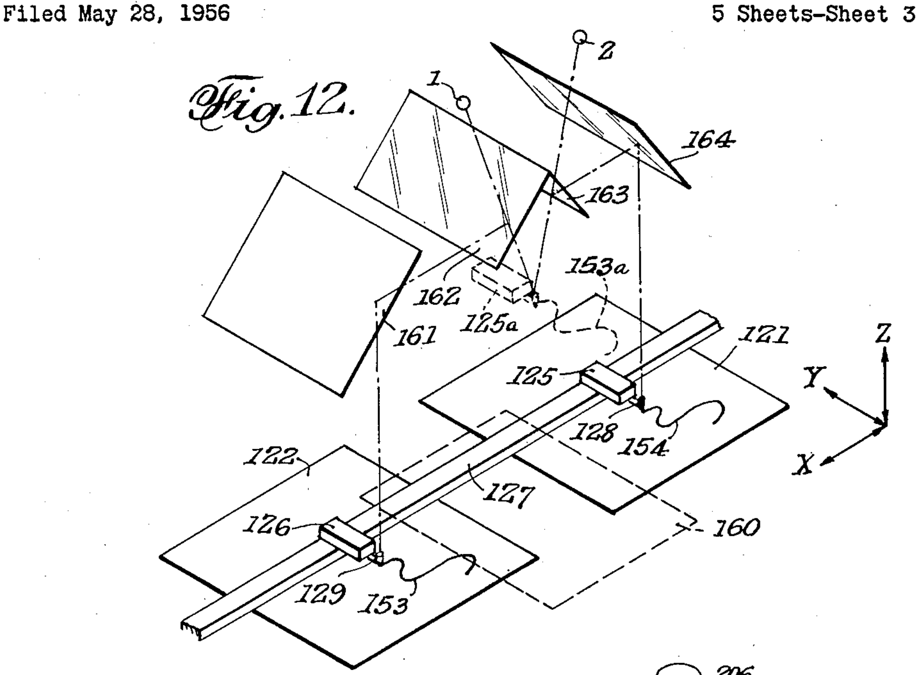
FIG. 12 is a fragmentary view in perspective of a preferred manner of viewing the aparatus in FIG. 11.

From the foregoing description of FIG. 11, *it* will be evident that the two traces 153 and 154 may be displaced as a function of coordinate Z during the simultaneous marking of sheets 121 and 122 so that upon placing said two sheets in a stereoscopic viewer, the two marks or traces will have a visually apparent disposition on the coordinate Z, the same being illustrated in FIG. 12.

Said FIG. 12 is a fragmentary representation showing the rack 127 and carriages 125 and 126 which plot traces 153 and 154. An observer with left eye 1 and right eye 2 is shown stereoscopically viewing the recorded traces by means of inclined first-surface mirrors 161, 162, 163 and 164. These mirrors are arranged in a fashion similar to that of binoculars and binocular range finders to effectively increase the interocular distance between the observer's eyes to a value appropriate to the size of the plotting surfaces 121 and 122. The observer sees plotting surfaces 121 and 122 as an apparent reference plane 160 located beyond the initial plotting surface and sees a trace 153*a* and a plotting carriage 125*a* that are perceived to vary in position and height as a function of the input variables.

Figure 13:
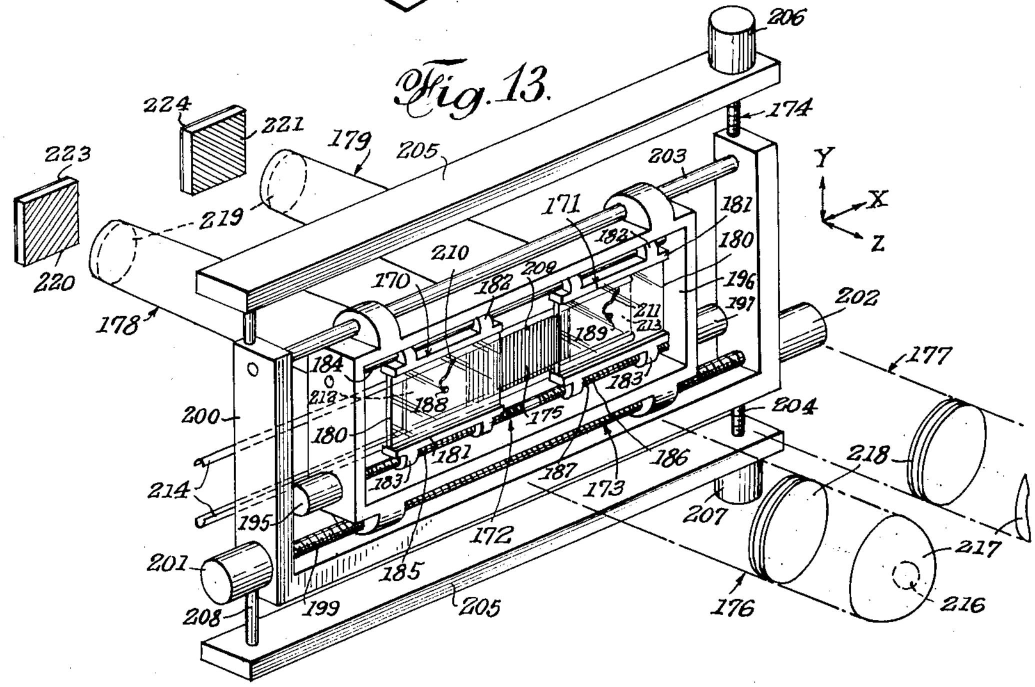
FIG. 13 is a perspective view, in semi-diagramamtic form, of rectangular-coordinate plotting apparatus adapted for projection viewing.

FIG. 13 represents apparatus that is adapted to plot traces and project the same onto a screen and providing a three-dimensional image synthesized from three-dimensional coordinate information as hereinbefore indicated. The apparatus shown in FIG. 13 has general basis and is an extension of the apparatus disclosed in our pending application entitled Data Plotting and Indicating Device, Serial No. 533,587, filed September 12, 1955, said application issuing as Patent No. 2,859,659 on November 11, 1958.

The plotting apparatus shown in FIG. 13 comprises, generally, tracing or plotting means 170 and 171, means 172 to vary the displacement between means 170 and 171, means 173 to move both means 170 and 171 in a direction exemplified by arrow X, means 174 to move means 170, 171, 172 and 173 in a transverse direction exemplified by arrow Y, a plotting field 175 operatively engaged by tracing means 170 and 171, means 176 and 177 providing illumination of the traces produced on field 175, and means 178 and 178 constituting optical projectors of said traces.

The tracing or plotting means 170 and 171 are generally similar, each comprising a flat transparent and rectangular sheet 180 mounted in a frame 181 that is provided with oppositely arranged pairs of bearings 182 and 183, the same being formed in or on ears integrally provided on each frame 181. The bearing ears 182 have smooth guiding engagement with a guide bar 184. The ears 183 on one frame 181 are provided with threads of one hand and the ears 183 on the other frame are provided with threads of the opposite hand. Said two sets of threaded ears 183 are engaged with opposite-hand screw threads 185 and 186 on the lead screw 187 that is parallel to guide bar 184.

Sheets or plates 180 are each preferably formed of a heat-resistant and non-shatterable material, of which Pyrex glass and one of the clear plastics, such as Lucite, are examples. One plate 180 mounts a stylus or marker 188 that is preferably made of a transparent material, such as fused quartz. The other plate similarly mounts a stylus or marker 189. Said styli are preferably located at the centers of their respective plates, substantially as shown, and both project in the same direction from said plates 180 and are pointed so as to line-mark. Means are provided but not shown for lightly biasing plates 180 in a manner to provide positive contact of styli 188 and 189 against the plotting field means 175. The means 172 includes the lead screw 187 having the threads 185 engaged in ears 183 of one means 170 and also threads 186 of the opposite hand and engaged with ears 183 of the other means 171. Rotation of said screw 187 is imparted by a reversible servo-motor or the like 195, said motor and lead screw 192 being supported by a frame 196. A stereo-displacement reference potentiometer or the like 197 provides a continuous reference of the position of lead screw 187. Rotation of screw 187 produces opposite movement of plates 180 in the direction shown by arrow X.

The means 173 is shown as a lead screw 199 that is parallel to screw 187 and is threadedly engaged with frame 196, said screw 199 being carried by a frame 200. Rotation of screw 199 is imparted by a servo-motor 201 causing movement of frame 196 and means 170 and 171 in the direction of arrow X and in a direction according to the direction of rotation of lead screw 199. A reference potentiometer 202 provides a means of monitoring the horizontal position of frame 196. A horizontal bar 203 guides the frame 196 in the same way that bar 184 guides the frames 181.

The means 174 is shown as a lead screw 204 that is arranged to be normal to screws 187 and 199, the same being carried by a frame 205 and in threaded engagement with frame 200. Rotation of screw 204 is imparted by a servo-motor 206 causing movement of frame 200 and all the components carried thereby in the direction of arrow Y and in a direction according to the direction of rotation of lead screw 204. A reference potentiometer 207 provides a means of monitoring the vertical position of frame 200. A vertical guide bar 208 guides the frame 200 in a manner similar to bars 184 and 203.

It will be clear from the foregoing that the styli 188 and 189 are capable of being moved universally and simultaneously by the means 173 and 174 in the plane in which the means 170 and 171 are mounted and within the limits of size of frame 200 and the frame 205. It will also be evident that movements or variations in the direction shown by the arrow Z can be recorded in a stereographic manner by changes in the separation between the styli 188 and 189, which separation is capable of being varied by the means 172 within the limits provided by frame 196.

The plotting field means 175 is shown as a transparent plate 209 disposed in parallelism with the coplanar plates 180. The surface of plate 209 is provided with a preferably opaque coating that is readily displaced or cut by a sharp instrument or stylus to provide clear traces, such as 210 and 211. The areas 212 and 213 of plotting field means 175 carry the two separate images that constitute the stereographic plot. Said areas are substantially smaller in length and width than are the plates 180 and are separated by a sufficient distance to allow the optical elements 178, 179, 176 and 177 to be mounted and to allow plates 180 to be displaced without mutual interference. These areas 212 and 213 are preferably portions of the same transparent plate 209 so that the entire plotting means 175 can be removed from its holder 214 without the likelihood of misalignment of recorded traces 210, 211, and so that the plotting field 175 can be viewed conveniently as a stereo-pair or filed for reference and future use.

The above-described plotting and field means may be illuminated to pass light through plates 180, said light being intercepted in whole or in part by the opaque coating of plate 209 and passing through said plate wherever a trace 210 and 211 is formed in said coating. The means 176 and 177 provide such illumination and each is here shown in typical fashion as a source of light 216, a suitable reflector 217, and suitable condensing lenses 218 interposed between the light source and means 170 and 171.

The projectors 178 and 179 are generally conventional, comprising objective lenses 219, an optional pair of polarizing filters 220 and 221, and an optional pair of color filters 223 and 224. The image of the plotting field is projected by means 178 and 179 onto a suitable screen such as shown at 225 in FIG. 14.

Figure 14:
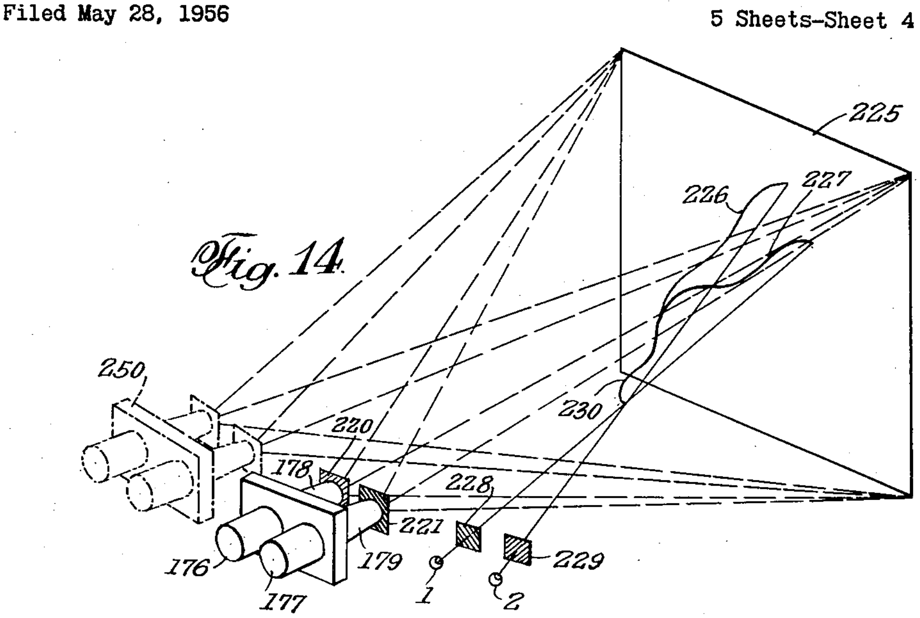
FIG. 14 is a perspective view, in schematic form, showing a plurality of devices, as shown in FIG. 13, arranged to project plots, traces, recordings, and other data on a common viewing surface and the manner of viewing thereof.

In FIG. 14, the manner in which the apparatus above described may provide a projected image which may be viewed in three dimensions, is shown diagrammatically. The trace projected by the projector 178 and passing through polarizing filter 220 produces an image 226. Similarly, the trace produced by projector 179 and passing through filter 221, appears as an image 227. If the screen 225 is made of a material such as aluminized fabric or the like and does not alter the polarization of light, the projected traces may be viewed by similarly oriented polarizing filters 228 and 229 to form an apparent image in three dimensions. The observer's left eye 1 views screen 225 through polarizing filter 228 which is oriented substantially parallel to polarizing filter 221 and at right angles to polarizing filter 220. Thus, the left eye will be capable of seeing only trace 227. Similarly, the observer's right eye 2, viewing screen 225 through polarizing filter 229, oriented at right angles to filter 228, can see only trace 226. The subjective effect is to produce a single three-dimensional trace shown schematically as trace 230.

Projectors similar to the one above described in FIG. 14, indicated schematically by projector assembly 250, may also be provided to project additional traces onto the same screen 225, thereby allowing plotting of a plurality of traces in three dimensions in correct relationship to one another and without mutual interference. A plurality of such projectors may be rigidly mounted with respect to each other and to screen 225 and may have their lenses aligned and their plotting scales adjusted to insure proper and accurate coincidence of images. It is desired for proper three-dimensional viewing that the focal lengths and lens distortions of each pair of lenses of optical projectors 178 and 179 which comprise the optics of a stereo-projector, be carefully matched to prevent depth distortion of the three-dimensional trace. Each stereo-projector may be provided with colored filters to enable the color coding of the projected traces as described in the mentioned copending patent application. It is furthermore desirable that provision be made to allow the individual lamp assemblies 176 and 177 of each stereo-plotter projector to be turned on and off individually. When one lamp is turned off, removing one of the stereo-views, the result becomes a two-dimensional image allowing the individual comparison of traces in a two-dimensional manner, when such is desired. Additional projector pairs may be adapted to project such auxiliary graphical information as might be desired, such as three-dimensional scales, three-dimensional charts or topographic maps, etc.

Where it is required that accurate positional information be obtainable from the three-dimensional traces appearing on the screen 225, it is possible to utilize a modified plotting instrument of the type described in FIG. 13. The modified instrument is identical to that shown, with the exception that the plotting field 175 and the styli 188 and 189 are omitted. Furthermore, the transparent plates 180 are replaced with opaque plates having small holes or transparent spots in the locations of the omitted styli. The result of such modification is that, rather than producing and projecting a pair of traces 210 and 211, the instrument will now project spot images of the holes above mentioned. The control of X, Y and Z displacements may then be set by calibrated knobs to allow the apparent location of the spot image to be translated in any direction to correspond to any desired point of the other traces in the display. When this is done, reference to the calibrated knobs will allow the X, Y and Z coordinates of the desired point to be indicated directly.

Figure 15:
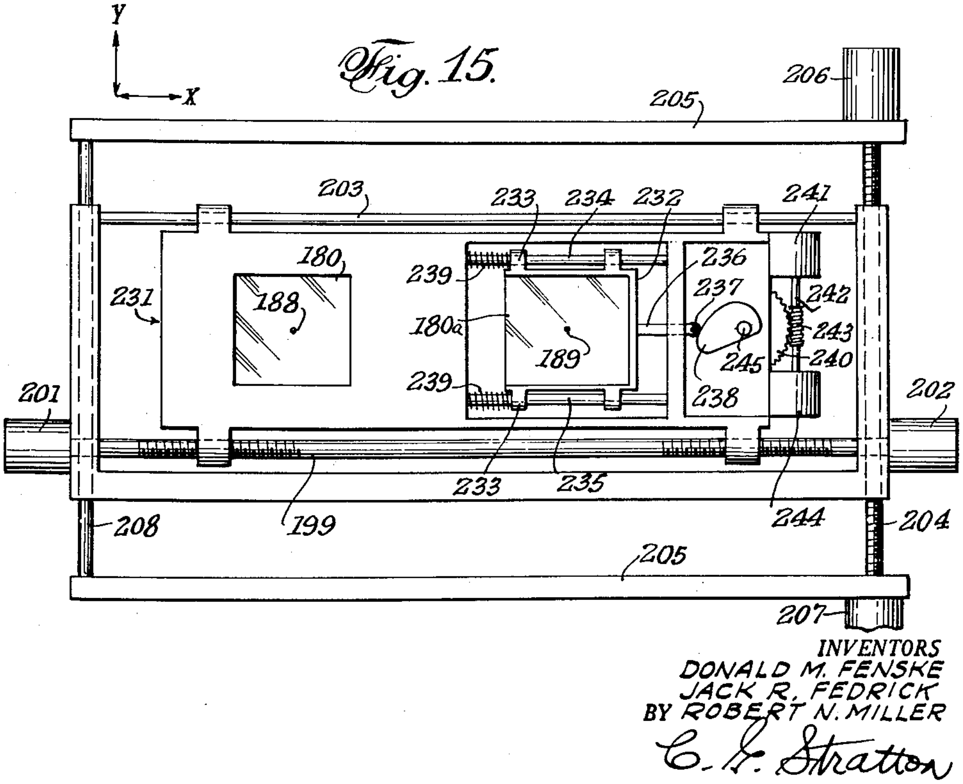
FIG. 15 is a front elevational view of the plotting apparatus of FIG. 13, showing the manner in which auxiliary computer equipment may be eliminated.

FIG. 15 shows a modification of the apparatus shown in FIG. 13 and in which frame 196 is replaced by frame 231. This modification is made to eliminate the computation equipment required to translate variations in the Z axis into equivalent displacements of the two recording styli and contemplates the use of a suitable cam and servo-mechanism to translate the linear variations of the Z axis into non-linear displacements along the X axis, of the separation of the recording styli 188 and 189. The manner in which this is done is evident from FIG. 15. Here, the plates 180 and 180*a* correspond to plates 180 of FIG. 13 and the styli 188 and 189 correspond to those of said figure. Plate 180 is rigidly fixed in frame 231. Plate 180*a* is supported in a frame 232 having bearings 233 in the form of projecting ears. Parallel rods 234 and 235, supported by frame 231, are engaged by ears 233 and serve as guides and supports for frame 232, allowing motion of plate 180*a* with respect to plate 180 in the direction of the X arrow. An extension of frame 232, in the form of push rod 236, is provided with a rotatable cam follower 237 and the latter is held in intimate contact with cam 238 by biasing springs 239. Cam 238 is mounted on shaft 245 which extends through frame 231 and is connected to a worm gear 240. Rotation of gear 240 and, thus, of cam 238, is provided by a servo-motor 241 connected to a shaft 242 which mounts worm 243, which is in mesh with gear 240. A stereo-displacement reference potentiometer 244 connected to worm shaft 242 provides a reference of the position of gear 240 and thus of variations in the angular position of cam 238. This cam is shaped so that its contour is the displacement of stylus 189 with respect to stylus 188 and, therefore, is the computed displacement for all values of the Z variable. Such an arrangement does not have the flexibility of scale factor adjustment provided by a computer, but it permits the use of a simple control circuit where the advantages of a computer are not needed.

In the previous descriptions, it has been assumed that the means of controlling the plotted position will utilize a servo-motor as a method of motivation and a potentiometer as a means of reference. These two means serve as the output and input elements of a conventional servomechanism. The servomechanism can be used to permit exact mechanical displacements of the plotter styli to be obtained in response to changes in the magnitude of an input voltage reference. An amplifier, not shown, may be used to compare the input reference voltage and a voltage obtained from the potentiometer. The amplified output resulting from a voltage difference is used to operate the motor until said difference has been reduced to essentially zero. This servomechanism has been demonstrated as a preferable embodiment of the control means of the present invention which is not deemed to be limited thereto. The application of this type of servomechanism, utilizing D.C. voltages as a method of computing and control, has certain advantages in the simplicity of the equipment required to compute displacements due to variations in the Z azis. For this reason and for clarity in presentation, the following description of the computing and control circuits will be based upon this type of control apparatus.

Figure 16:
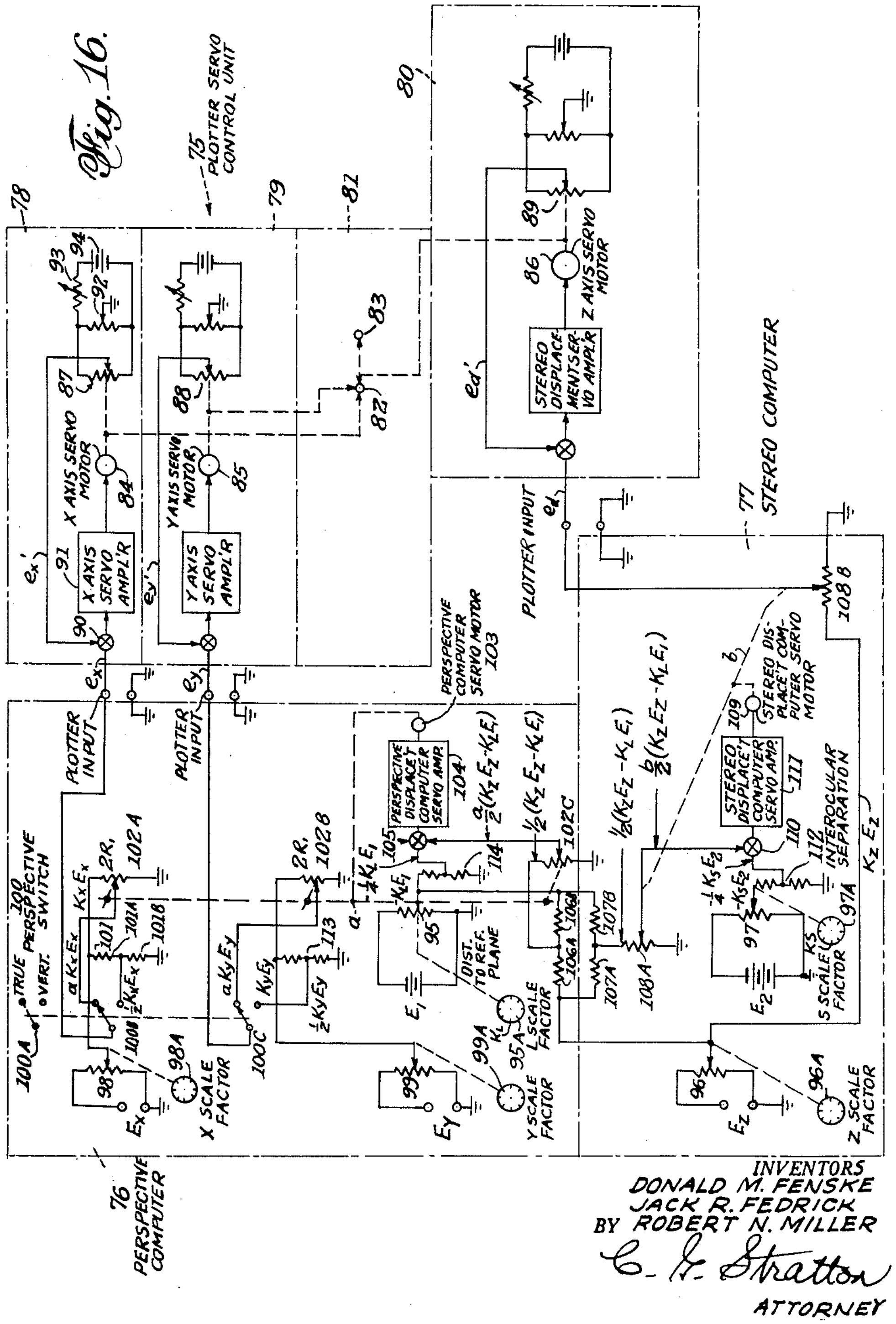
FIG. 16 is a schematic block diagram showing a preferred manner of computing displacements and controlling movements of the marking instruments in the present apparatus.

In FIG. 16 is shown a schematic block diagram of a preferred form of control circuitry and computer circuitry that may be applied to the present apparatus. There are three principal components that constitute the control system and its associated computers. These are the plotter servo-control unit 75, the perspective computer 76, and the stereo-computer 77, shown by their respective areas defined by dot-dash lines.

The plotter servo-control unit 75 comprises four major units, an X axis servo-control unit 78, a Y axis servo-control unit 79, a stereo-displacement servo-control unit 80, and the plotting mechanism 81. The plotting mechanism utilizes two plotting styli 82 and 83. These styli are positioned in the X direction by servo-motor 84, positioned in the Y axis by servo-motor 85, and have relative displacement that is controlled by servo-motor 86. Potentiometers 87, 88 and 89 provide references of the X axis displacement, Y axis displacement, and stereo-displacement, respectively. These internally generated references of positional displacements are compared to corresponding references supplied by the perspective computer and the stereo computer and the resulting differences are used to correct the plotting mechanism until these differences are minimized.

The relationship of the servo-control units for each of the three axes as described in FIG. 16 to the structural parts of previous figures can be determined from the following table:

| Function | Fig. 10 | Fig. 11 | Fig. 13 | Fig. 15 | Fig. 16 |
|---|---|---|---|---|---|
| X axis servo-motor | 45 | 149 | 201 | 201 | 84 |
| X axis feedback potentiometer | 46 | 152 | 202 | 202 | 87 |
| Y axis servo-motor | 43 | 158 | 206 | 206 | 85 |
| Y axis feedback potentiometer | 44 | 159 | 207 | 207 | 88 |
| Z axis servo-motor | 53 | 145 | 195 | 241 | 86 |
| Z axis feedback potentiometer | 56 | 148 | 197 | 244 | 89 |

Except for the function which is being plotted, the operations of each of the three servo-control units 78, 79 and 80 are identical and the three operations can be exemplified by a description of the X axis servo-control unit 78.

The present circuit embodies an error detector 90 between an input voltage $e_x$ and an output voltage $e_x'$ that may be derived from feedback potentiometer 87 and battery 94. The differential voltage provided by the error detector 90 is amplified by amplifier 91, the same driving servo-motor 84 until the input and output voltages are balanced or equalized. Thus, the styli 82 and 83 have been moved to a position in accordance with the value of $e_x$. Separate controls 92 and 93 may be provided that enable the positioning of the styli at $e_x=0$ to be varied and which permit the scale factor to be controlled, i.e., how much stylus displacement a given $e_x$ voltage change will produce. This circuitry is intended as exemplary since the same is based on known techniques for controlling the operation of servo-motors, and the same is here given for reasons of clarity. The above-described X axis servo-control unit may be substantially duplicated for input voltage $e_y$ to control the Y axis servo-motor 85 and for input voltage $e_d$ to control the stereo-displacement servo-motor 86.

The preceding description for servo-control units to effect displacement of the record-producing stylus, assumes that an input voltage is used in which the magnitude of the voltage controls the position of the recording stylus. In the following description of stereo and perspective computers, it has been assumed that each input data reference of information to be recorded is, or has been, converted to a proportional voltage and that this voltage magnitude will ultimately be used to control the recording styli.

The stereo-displacement computer 77 provides an input reference voltage $E_z$ that is proportional to the Z axis, coordinate to be plotted. It provides an output reference of stereo-displacement $e_d$ that is a function of the distance from observer to the desired reference plane (L scale factor dial setting 95A), the Z axis plot scale factor dial setting 96A, and the desired interocular spacing ($s$ scale factor dial setting 97A), as well as the input reference voltage $E_z$. This output reference voltage is of a form and magnitude that may be utilized directly in the stylus displacement servo-control unit 80.

The perspective computer 76 utilizes separate refernce inputs for X axis voltage $E_x$ and Y axis voltage $E_y$ and provides output reference voltages $e_x$ and $e_y$ that may be applied directly to the X axis servo-control unit 78 and Y axis servo-control unit 79. These output voltages are functions not only of the input voltages $E_x$ and $E_y$, but are also dependent upon the X axis scale factor setting 98A, the Y axis scale factor 99A, perspective switch setting 100A, input voltage $E_z$, Z axis scale factor setting 96A, and L scale factor setting 95A. The perspective switch 100 provides a means of selecting a vertical perspective in which all objects are viewed vertically, or a true perspective in which all objects are viewed from a single location.

In the perspective computer, the X axis input voltage $E_x$ is applied to scale factor potentiometer 98 and is reduced by a fraction $k_x$ which is calibrated on dial 98A as X axis scale factor. The resulting voltage $k_xE_x$ is applied both to a voltage divider 101 consisting of equal resistors 101A and 101B and to a computing potentiometer 102A that is driven by the perspective computer servo-motor 103. The output voltage ($\frac{1}{2} k_xE_x$) from voltage divider 101 or the output voltage ($ak_xE_x$) are applied to a section 100B of the perspective selector switch 100. The output voltage $e_x$ in the case of vertical perspective will be:

$$e_x=\tfrac{1}{2}k_xE_x \qquad (16)$$

If the perspective switch is in the true position, the output voltage $e_x$ becomes:

$$e_x=ak_xE_x \qquad (17)$$

The coefficient $a$ of potentiometers 102A, 102B and 102C is determined by the perspective computer servo-motor 103. The position of this motor is controlled by servo-amplifier 104 and the error detector 105. Coefficient $k_L$ of potentiometer 95 is calibrated on dial 95A in terms of L scale factor. The output of potentiometer 95 is $-k_LE_1$ where $E_1$ is a constant negative reference voltage. The potentiometer 96 coefficient $k_z$ is calibrated on dial 96A in terms of Z axis scale factor. The resulting Z axis reference voltage $k_zE_z$ is applied to a voltage summing circuit 106 consisting of equal resistors 106A and 106B. The opposite end of said circuit 106 is connected to the L scale factor reference voltage $-k_LE_1$. The resulting summation voltage $$\tfrac{1}{2}(k_zE_z-k_LE_1)$$

is applied to perspective computer potentiometer 102C where it is reduced by coefficient $a$. The resulting output voltage $a/2(k_zE_z-k_LE_1)$ is applied to the error detector 105 and compared with $$\frac{k_LE_1}{4}$$

obtained from voltage divider 114. Since the action of servo-motor 103 is to vary the coefficient $a$ until the difference between the voltages applied to error detector 105 are zero, at balance the following relationship holds:

$$\frac{-k_LE_1}{4}=\frac{a}{2}(k_zE_z-k_LE_1) \quad (18)$$

$$a=\frac{1}{2}\,\frac{k_LE_1}{k_LE_1-k_zE_z} \quad (19)$$

Thus, $e_x$ for the true perspective position of switch 100 becomes $$e_x=\frac{k_xE_x}{2}\left(\frac{k_LE_1}{k_LE_1-k_zE_z}\right) \quad (20)$$

Figures 6, 8:
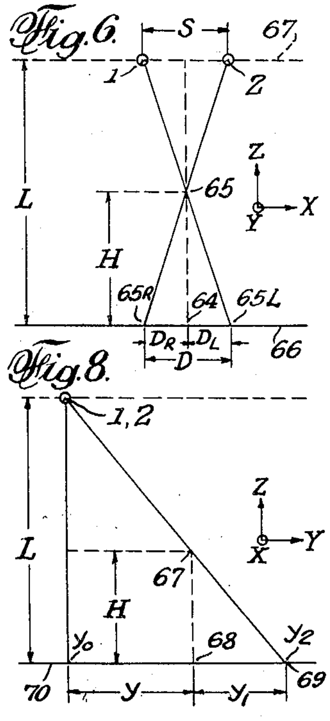
FIG. 6 is a diagrammatic view showing the geometrical relationships between a ploted image and its apparent location.
FIG. 8 is a diagrammatic view of a modification in which a perspective function is embodied in a relationship between a plotted image and its apparent location.

The scale factors must all be chosen to permit input voltages $E_x$, $E_y$ and $E_z$ to give apparent displacements X, Y and H as shown in FIGS. 8 and 9. Thus:

$$X=\frac{k_xE_x}{2} \quad (21)$$

$$Y=\frac{k_yE_y}{2} \quad (22)$$

$$H=Z=\frac{k_zE_z}{2} \quad (23)$$

Similarly, constants must be chosen so that the reference voltages corresponding to L have the required dimensional relationship to X, Y and H. Therefore:

$$L=\frac{k_LE_1}{2} \quad (24)$$

Substituting Equation 21 into Equation 16 gives:

$$e_x=X \quad (25)$$

which is the result needed for vertical perspective. Similarly, substituting Equations 21, 23 and 24 into Equation 20 gives:

$$e_x=X\left(\frac{L}{L-H}\right) \quad (26)$$

which corresponds to Equation 13.

In a manner similar to that described for the reference voltage $E_x$, coefficient $k_y$ of potentiometer 99 is calibrated on dial 99A as Y axis scale factor. Voltage divider 113 provides:

$$e_y=\tfrac{1}{2}k_yE_y$$

when switch 100 is in the vertical perspective.

The resultant voltage $k_yE_y$ is applied to a voltage-adding circuit consisting of equal resistors 107A and 107B. This network 107 is connected in parallel with network 106 and provides an output voltage $$\tfrac{1}{2}(k_zE_z-k_LE_1)$$

to potentiometer 108A in which coefficient $b$ is determined by a stereo-displacement computer servo-motor 109. The resulting voltage $b/2(k_zE_z-k_LE_1)$ is applied to the error detector 110. Potentiometer 97 has coefficient $k_s$ which is calibrated on dial 97A in terms of interocular separation ($s$ scale factor). A negative reference voltage $E_2$ is modified by this potentiometer to become $-k_sE_2$ which is divided by four in voltage divider 112 and applied to the error detector 110. Servo-amplifier 111 and servo-motor 109 act to correct coefficient $b$ of potentiometers 108 to reduce the difference between voltage applied to error detector 110 to zero. At balance, the following relationship holds:

$$\frac{-k_sE_2}{4}=\frac{b}{2}(k_zE_z-k_LE_1) \quad (27)$$

From this, coefficient $b$ is:

$$b=\frac{-1}{2}\left(\frac{k_sE_2}{k_zE_z-k_LE_1}\right) \quad (28)$$

The Z axis reference voltage $k_zE_z$ from the Z axis scale factor potentiometer is applied to potentiometer 108B. This voltage is modified by coefficient $b$ to become the output voltage $e_d$ which may be utilized directly to establish stereo-displacement. This voltage is:

$$e_d=bk_zE_z \quad (29)$$

$$=\frac{-k_zE_z}{2}\left(\frac{k_sE_2}{k_zE_z-k_LE_1}\right) \quad (30)$$

$$=\frac{k_sE_2}{2}\left(\frac{k_zE_z}{k_LE_1-k_zE_z}\right) \quad (31)$$

These scale factors must be adjusted so that the correct dimensional relationship to X, Y and H is held. Thus:

$$S=\frac{k_sE_2}{2} \quad (32)$$

Substituting Equations 23, 24 and 32 into Equation 31 gives:

$$e_d=S\left(\frac{H}{L-H}\right) \quad (33)$$

which is of the same form as the desired Equations 2 and 5.

From these relations, it is evident that the computer apparatus described will yield the necessary relationships to plot the two types of perspective described earlier. It is evident that caution must be exercised in the selection of computing voltages and scale factors if the recording is to be maintained within the confines of the available plotting area. In the computer described, the servo-computing potentiometer relationships have been chosen for the limiting case of $$-\infty>H\gtreqless\tfrac{1}{2}L$$

since it is not desirable to attempt to bring the apparent image location closer to the observer than his eyes can comfortably tolerate.

The above disclosure of three-dimensional plotting systems, while limited to rectangular coordinate systems, can, in fact, be applied to any curvilinear system in which one axis is rectilinear and mutually perpendicular to the other two. If that axis is oriented to be parallel to the Z axis, previously described, the plot may be contained within the plotting plane and, although the coordinate system used may be different from the X and Y axis indicated, the required stereo-displacement necessary for a stereoscopic viewing may still be introduced. Thus, for example, a polar plot may be extended along the Z axis to form a three-dimensional plot in cylindrical coordinates. A plotter may therefore be caused to trace a pattern in any desired planar coordinate system, and by producing two such traces as a function of a Z coordinate which is normal to the plotting plane, the desired stereo-pair may be produced and may be viewed without departing from the spirit of the present invention. In the appended claims, the expressions X and Y coordinates, although characteristic of the nomenclature used in rectangular coordinates, are not to be deemed restrictive to this coordinate system but should be considered to be representative of the specified variables in any desired coordinate system.

While the foregoing has illustrated and described what are now contemplated to be the best modes of carrying out our invention, the constructions are, of course, subject to modification without departing from the spirit and scope of the invention. It is, therefore, not desired to restrict the invention to the particular forms of construction illustrated and described, but to cover all modifications that may fall within the scope of the appended claims.

As an example of the variations above referred to, and within the concepts of this invention, lie alternative methods of accomplishing the results indicated. One such method requires two single-channel, two-dimensional plotters. If these two plotters are adjusted to be mechanically and electrically identical in their response, it is possible to supply each with the same X and Y dimensional information and with a mechanical or electrical displacement that may be introduced into these variables before they are plotted, rather than directly into the plotter, as hereinbefore. This variation will accomplish substantially the same effect as the described embodiments of the invention.

Having thus described our invention, what we claim and desire to secure by Letters Patent is:

1. Three-dimensional plotting apparatus comprising a generally rectangular mounting frame, a second rectangular frame within the mounting frame and disposed in a plane parallel to the general plane of the mounting frame, means to move the second frame linearly in opposite directions along a coordinate Y that corresponds to one dimension of said second frame, a third rectangular frame within the second frame and disposed parallel to the mentioned frames, means to move the third frame linearly in opposite directions along a coordinate X that corresponds to a dimension of the third frame that is at right angles to said one dimension of the second frame, means connecting the third frame and the second frame whereby the former moves along the coordinate Y together with the second frame, two parallel transparent plates parallel to the plane of and carried by the third frame, each said transparent plate being provided with a stylus, means to move said transparent plates in the plane of said plates simultaneously and relatively and in the plane of the third frame, a fixed plotting field parallel to the transparent plates and engaged by said styli to be marked by traces formed by movement of the styli across the mentioned field, means to pass light through said transparent plates and the traces formed on the plotting field during operation of the plate moving means, and means to stereoptically view said traces during such movement to, thereby, visually create an image of said traces on a Z coordinate normal to the planes of said frames and plates and to each coordinate X and Y.

2. Three-dimensional plotting apparatus according to claim 1 in which one of said transparent plates and its stylus is fixedly carried by and moves with the third frame in the mutually transverse X and Y coordinates, and in which is provided means controlling movement of the other transparent plate and the stylus thereof in the mentioned plane of the third frame to displace the plotted position of the trace formed by said latter stylus relative to the other trace a distance that is computed as a function of position along said Z coordinate.

3. Three-dimensional plotting apparatus according to claim 2 in which the movement-controlling means comprises a cam carried by the frame that fixedly mounts said one transparent plate and stylus and into the operative contour of which is embodied the function of position on the Z coordinate, and means carried by the third frame to drive said cam in directions to move the other transparent plate and stylus according to said computed function.

4. In combination, X-axis control means adapted to receive X-axis dimensional information, Y-axis control means adapted to receive Y-axis dimensional information, a first member movable in a plane on a line in two opposed directions under control of the X-axis control means, a second member carried by the first member movable independently in the same plane on a line in two opposed directions intersecting the line of movement of the first member and under independent control of the Y-axis control means, a pair of marking elements carried by the second member, Z-axis control means adapted to receive Z-axis dimensional information and including a cam formed to have predetermined Z-axis variations, said cam being carried by the second member, control means independent of the X-axis and Y-axis control means carried by the second member to operate said cam, and means engaged with the cam to move the marking means in accordance with Z-axis variations to displace the marking means relative to each other by a predetermined amount during operation of the X-axis and Y-axis control means.

5. Three-dimensional plotting apparatus comprising a mounting frame, a second frame within the mounting frame and disposed in a plane parallel to the general plane of the mounting frame, means to move the second frame linearly in opposite directions along a coordinate Y that corresponds to a dimension of the second frame, a third frame within the second frame and in parallelism with the mentioned frames, means to move the third frame linearly in opposite directions along a coordinate X that corresponds to a dimension of the third frame that is at right angles to said one dimension of the second frame, means connecting the third frame and the second frame whereby the former moves along the coordinate Y together with the second frame, two coplanar light-passing means parallel to the plane of and carried by the third frame, each said coplanar means being provided with a stylus, means to move said coplanar means in the plane thereof simultaneously and relatively and in the plane of the third frame, a plotting field parallel to said coplanar means and engaged by said styli to be marked by traces formed by movement of the styli across the plane of said field, light means to direct light through the coplanar means and the traces formed on the plotting field during operation of the means to move the coplanar means, and means to stereoptically view said traces during such movement to thereby visually create an image of said traces on a Z coordinate that is normal to the planes of said frames and coplanar light-passing means and to each coordinate X and Y.

6. Three-dimensional plotting apparatus according to claim 5 in which one of said coplanar light-passing means and the stylus thereof are fixedly carried by and move with the third frame in the mutually transverse X and Y coordinates, and means controlling movement of the other of said coplanar means and the stylus thereof in the mentioned plane of the third frame to displace the plotted position of the trace formed by said latter stylus relative to the trace formed by the first-mentioned stylus a distance that is computed as a function of position along said Z coordinate.

7. Three-dimensional plotting apparatus according to claim 6 in which the movement-controlling means of said other coplanar means comprises a cam carried by the frame that fixedly mounts said first-mentioned light-passing means and its stylus and into the operative contour of which is embodied the function of position on the Z coordinate, and means carried by the third frame to drive said cam in directions to move the other light-passing means and stylus thereof according to said computed function.

(References on following page)

References Cited in the file of this patent

UNITED STATES PATENTS

| | | |
|---|---|---|
| 2,171,894 | Rule | Sept. 5, 1939 |
| 2,451,031 | Kelsh | Oct. 12, 1948 |
| 2,560,658 | Pareto | July 17, 1951 |
| 2,587,585 | Ayres | Mar. 4, 1952 |
| 2,727,308 | Kuhn et al. | Dec. 20, 1955 |
| 2,859,521 | Cook | Nov. 11, 1958 |

FOREIGN PATENTS

| | | |
|---|---|---|
| 862,668 | France | Dec. 16, 1940 |